(12) United States Patent
Fechner et al.

(10) Patent No.: US 7,517,822 B2
(45) Date of Patent: *Apr. 14, 2009

(54) UV-BLOCKING BOROSILICATE GLASS, THE USE OF THE SAME, AND A FLUORESCENT LAMP

(75) Inventors: Joerg Fechner, Mainz (DE); Franz Ott, Mitterteich (DE); Rainer Haspel, Monsheim (DE); Ralf Diezel, Mitterteich (DE)

(73) Assignee: Schott AG, Mainz (DE)

( * ) Notice: Subject to any disclaimer, the term of this patent is extended or adjusted under 35 U.S.C. 154(b) by 463 days.

This patent is subject to a terminal disclaimer.

(21) Appl. No.: 10/512,716

(22) PCT Filed: Mar. 26, 2003

(86) PCT No.: PCT/EP03/03112

§ 371 (c)(1),
(2), (4) Date: Oct. 27, 2004

(87) PCT Pub. No.: WO03/097544

PCT Pub. Date: Nov. 27, 2003

(65) Prior Publication Data

US 2005/0151116 A1    Jul. 14, 2005

(30) Foreign Application Priority Data

May 16, 2002 (DE) ................. 102 21 747
Nov. 19, 2002 (DE) ................. 102 53 756

(51) Int. Cl.
C03C 3/093 (2006.01)
C03C 3/091 (2006.01)
C03C 3/089 (2006.01)

(52) U.S. Cl. .............. 501/67; 501/65; 501/66
(58) Field of Classification Search .......... 501/66, 501/65, 67
See application file for complete search history.

(56) References Cited

U.S. PATENT DOCUMENTS

| 968,315 | A | | 8/1910 | Beckert |
| 3,499,775 | A | | 3/1970 | Albinak et al. |
| 4,562,161 | A | * | 12/1985 | Mennemann et al. ......... 501/59 |
| 5,200,369 | A | * | 4/1993 | Clifford et al. ................ 501/66 |
| 5,244,848 | A | * | 9/1993 | Clifford et al. ................ 501/66 |
| 5,304,516 | A | * | 4/1994 | Clifford ....................... 501/21 |
| 5,447,891 | A | * | 9/1995 | Spinosa et al. ................ 501/16 |
| 5,747,399 | A | | 5/1998 | Kosokabe et al. |
| 5,976,999 | A | | 11/1999 | Evans et al. |
| 6,794,020 | B2 | * | 9/2004 | Cotlear de Witzmann et al. 428/210 |
| 7,375,043 | B2 | * | 5/2008 | Fechner et al. ................ 501/65 |
| 2003/0087106 | A1 | * | 5/2003 | De Witzmann et al. ..... 428/432 |

FOREIGN PATENT DOCUMENTS

| DE | 32 06 227 C2 | | 7/1986 |
| JP | 08-012369 A | | 1/1996 |
| JP | 8-59289 | | 3/1996 |
| JP | 2002-60240 | | 2/2002 |
| JP | 2002-60241 | | 2/2002 |
| JP | 2002-60245 | | 2/2002 |
| JP | 2020-56808 | | 2/2002 |
| JP | 2002056808 A | * | 2/2002 |
| JP | 2002-68776 | | 3/2002 |
| JP | 2002068776 A | * | 3/2002 |

OTHER PUBLICATIONS

Derwent Abstract 2002-410356, English language abstract for JP 2002-68776 A.*
Derwent Abstract 2002-377229, English language abstract for JP 2002-56808 A.*
English Abstract of CN 1171376, Jan. 28, 1998.
Patent Abstracts of Japan JP 2002338296, Nov. 27, 2002.

* cited by examiner

*Primary Examiner*—Karl E Group
*Assistant Examiner*—Elizabeth A Bolden
(74) *Attorney, Agent, or Firm*—Michael J. Striker

(57) ABSTRACT

The invention relates to a borosilicate glass having the following composition (in wt. % based on oxide content): between 55 and 80 of $SiO_2$; between 8 and 25 of $B_2O_3$; between 0.5 and 10 of $Al_2O_3$; between 1 and 16 of $Li_2O+Na_2O+K_2O$; between 0 and 6 of $MgO+CaO+SrO+BaO$; between 0 and 3 of ZnO; between 0 and 5 of $ZrO_2$; between 0 and 5 of $Bi_2O_3$; and between 0 and 3 of $MoO_3$; the sum of the $Bi_2O_3$ and $MoO_3$ amounting to between 0.01 and 5. The invention also relates to a fluorescent lamp, especially a miniature fluorescent lamp.

12 Claims, No Drawings

UV-BLOCKING BOROSILICATE GLASS, THE USE OF THE SAME, AND A FLUORESCENT LAMP

The invention relates to a UV-blocking borosilicate glass and to the use of the same. The invention also relates to a fluorescent lamp.

Fluorescent lamps, known as backlights, are used as background illumination for, for example, displays, for example of personal computers, laptops, palmtops, vehicle navigation systems.

Typical sizes of miniaturized lamps of this type are an external diameter of between 2 and 5 mm. Typical internal diameters are between 1.8 and 4.8 mm.

Whereas standard fluorescent tubes consist of a soft glass which has a very low solarization stability, glasses which are more solarization-stable are used for backlights, the basic structure of which corresponds to that of fluorescent tubes, in order to ensure long-term functionality.

On account of the structure of the backlights, the glasses used have to be suitable for vacuum-tight fusing to a metal or metal alloy used in lamp manufacture. For this purpose, they have to have a thermal expansion which is matched to the thermal expansion of the metal or metal alloy. For example, if tungsten is used, given the coefficient of thermal expansion $\alpha_{20/300}$ of W of $4.4 \times 10^{-6}$/K, glasses with $\alpha_{20/300}$ of between $3.4 \times 10^{-6}$/K and $4.3 \times 10^{-6}$/K are particularly suitable. By way of example, if Kovar, an Fe—Co—Ni alloy, is used, glasses with $\alpha_{20/300}$ of between $4.3 \times 10^{-6}$/K and $6.0 \times 10^{-6}$/K are eminently suitable.

The glasses should Lend to have low working points $V_A$, i.e. $V_A < 1200°$ C., to allow them to be worked at relatively low temperatures. The transformation temperature $T_g$ should be matched to the melting characteristics of the metal or metal alloy to which it is to be fused. For example, in the case of fusing to Kovar, the transformation temperature should preferably be between $440°$ C. and $530°$ C. $T_g$ of up to $580°$ C. is eminently suitable for fusing to tungsten.

The transmission profile is a significant property of glasses. In the visible region, the highest possible light transmission is required, in order to obtain a high light yield from the lamp, whereas in the UV region no transmission or only a low transmission is the aim; in order for the minimum possible amount of the harmful UV radiation to be allowed to pass through. The UV-blocking requirements depend on the uses of the glasses. For example, if they are used as lamp glasses for fluorescent lamps, in particular the Hg line at 253 nm should be blocked.

For example, for backlights, a high UV blocking $\leq 253$ nm is desirable in order to ensure that irradiated plastic parts, for example in laptops, do not become yellow and embrittled. This requirement is met by glasses having a UV transmission at $\lambda \leq 254$ nm of $\tau \leq 0.1\%$, measured on specimens which are 0.2 mm thick. For other uses, an UV transmission $\tau \leq 0.1\%$ at $\lambda \leq 240$ nm is sufficient. In any event, the transition from the wavelength range which is not transmitted to the wavelength range which is transmitted should be as short as possible, i.e. the transmission curve should be as steep as possible in this region.

The minimum demand imposed on the transmission in the visible wavelength region is, at $\lambda > 400$ nm and with a specimen thickness of 0.2 mm, a transmission of 90%. Therefore, the requirement is $\tau$ (>400 nm; 0.2 mm)$\geq 90\%$.

A further important property of glasses for fluorescent lamps, in particular for backlights, is the resistance to solarization which is required in order to allow a long lamp service life to be achieved, i.e. a light yield which remains as constant as possible. In the present context, the term "solarization-stable" is to be understood as encompassing glasses which have a drop in transmission of at most 5% at 300 nm after 15 hours' HOK-4 irradiation, i.e. irradiation with an Hg high-pressure lamp with a main emission of 365 nm and an irradiation strength of 850 $\mu$W/cm$^2$ at 200 to 280 nm at a distance of 1 m on a glass specimen which is 0.2 mm thick.

The patent literature has already disclosed various documents which describe more or less UV-blocked glasses, in particular lamp glasses. However, these glasses have certain drawbacks, in particular a UV-blocking action which does not comply with the high demands imposed nowadays.

The borosilicate glass for discharge lamps which is described in JP 8-12369 A contains, for UV blocking purposes, a total of from 0.03 to 3% by weight of at least two of the four components $V_2O_5$, $Fe_2O_3$, $TiO_2$ and $CeO_2$. A high transmission and a high solarization resistance cannot be set using these components, in some cases in high individual proportions, and combinations thereof.

U.S. Pat. No. 5,747,399 describes a glass for miniaturized fluorescent lamps which is supposed to retain its solarization stability and its UV-impermeability by means of $TiO_2$ and/or PbO and/or $Sb_2O_3$. However, doping with $TiO_2$, in particular high levels of the latter, leads to discoloration of the class. PbO should also not be used, on account of the associated environmental problems.

Therefore, it is an object of the present invention to provide a glass having a high transmission in the visible region (>400 nm) and a high level of blocking in the UV region ($\leq 240$ nm), and also having a thermal expansion which is matched to the expansion of tungsten or Kovar.

The object is achieved by a borosilicate glass in accordance with the main claim.

A glass having the desired transmission properties comprises the base glass system (in % by weight, based on oxide): 55 to 80 $SiO_2$, 8 to 25 $B_2O_3$, 0.5 to 10 $Al_2O_3$, 1 to 16 $Li_2O+Na_2O+K_2O$, 0 to 6 $MgO+CaO+SrO+BaO$, 0 to 3 ZnO and 0 to 5 $ZrO_2$.

The presence of $MoO_3$ and/or $Bi_2O_3$, specifically in a total amount of from 0.01 to 5% by weight, with from 0 to 3% of $MoO_3$ and from 0 to 5% of $Bi_2O_3$, is crucial to the invention.

The minimum level of $MoO_3$ and/or $Bi_2O_3$ is a requirement in order to achieve the high UV blocking. Higher levels of $MoO_3$ and/or $Bi_2O_3$ would lead to discoloration of the glass. A minimum total amount of 0.1% by weight is preferred, and a minimum total amount of 0.2% by weight is particularly preferred, as is a maximum total amount of 3% by weight. A minimum $MoO_3$ content of 0.4% by weight or a minimum $Bi_2O_3$ content of 1.0% by weight is particularly preferred. $Bi_2O_3$ also greatly improves the solarization stability of the glass. In particular in the particularly preferred embodiments, it is possible to achieve UV blocking up to 254 nm, i.e. a $\tau \leq 0.1\%$ at $\tau \leq 254$ nm with a specimen thickness of 0.2 mm. A minimum $MoO_2$ content of 0.6% by weight or a minimum $Bi_2O_3$ content of 1.3% by weight is very particularly preferred.

The glass preferably comprises the glass system (in % by weight, based on oxide): $SiO_2$ 55-79, $B_2O_3$ 10-25, $Al_2O_3$ 0.5-10, $Li_2O+Na_2O+K_2O$ 1-16, $MgO+CaO+SrO+BaO$ 0-6, ZnO 0-3, $ZrO_2$ 0-1; $Bi_2O_3$ 0-5, $MoO_3$ 0-3; with $BiO_2+MoO_3$ 0.1-5.

It is particularly preferred for the glass to comprise the following glass system: $SiO_2$ 55-79, $B_2O_3$ 8-12.5; $Al_2O_3$ 0.5-10; $Li_2O+Na_2O+K_2O$ 1-16; $MgO+CaO+SrO+BaO$ 0-6; ZnO 0-3; $ZrO_2$ 0-3; $Bi_2O_3$ 0-5; $MoO_3$ 0-3; with $Bi_2O_3+MoO_3$ 0.01-5.

It is preferable not to add $ZrO_2$, so that the glass is $ZrO_2$-free, apart from inevitable impurities resulting from raw materials or tank furnace corrosion.

Glasses from the abovementioned composition ranges containing from 70-80% by weight of $SiO_2$ have coefficients of thermal expansion $\alpha_{20/300}$ of between $3.4 \times 10^{-6}$/K and $4.3 \times 10^{-6}$/K and are therefore particularly suitable for fusing to tungsten.

Glasses from the composition range (in % by weight, based on oxide) $SiO_2$ 73-79; $B_2O_3$ 12.5-25; $Al_2O_3$ 0.5-10; $Li_2O$+$Na_2O$+$K_2O$ 1-11; $MgO$+$CaO$+$SrO$+$BaO$ 0-6; $ZnO$ 0-3; $ZrO_2$ 0-5; $Bi_2O_3$ 0-5; $MoO_3$ 0-3; with $Bi_2O_3$+$MoO_3$ 0.01-5 are particularly preferred for fusing to tungsten.

Glasses from the abovementioned composition ranges containing from 55-75% by weight of $SiO_2$ have coefficients of thermal expansion of between $4.3 \times 10^{-6}$/K and $6.0 \times 10^{-6}$/K and are therefore particularly suitable for fusing to Kovar.

Glasses from the composition range (in % by weight, based on oxide) $SiO_2$ 55-73; $B_2O_3$ 15-25; $Al_2O_3$ 1-10; $Li_2O$+$Na_2O$+$K_2O$ 4-16; $MgO$+$CaO$+$SrO$+$BaO$ 0-6; $ZnO$ 0-3; $ZrO_2$ 0-5; $Bi_2O_3$ 0-5; $MoO_3$ 0-3; with $Bi_2O_3$+$MoO_3$ 0.01-5 are particularly preferred for fusing to Kovar.

The glass may contain the usual quantities of standard refining agents, such as for example evaporation refining agents, such as $Cl^-$ and $F^-$, but also Redox refining agents, which are active on account of their polyvalent cations, e.g. $SnO_2$ and $Sb_2O_3$. It is preferable for the glass to contain 0-1% by weight of $Sb_2O_3$, 0-1% by weight of $As_2O_3$, 0-1% by weight of $SnO_2$, 0-1% by weight of $CeO_2$, 0-0.5% by weight of Cl, 0-1% by weight of F, 0-0.5 of sulfate, given as $SO_3$.

$CeO_2$ assists with the refining but may have an adverse effect on the solarization stability if it is present in excessive quantity.

Furthermore, the glass may contain 0-5% by weight of $TiO_2$, preferably 0-1% by weight of $TiO_2$, and 0-3% by weight of PbO. $TiO_2$ assists $MoO_3$ and $Bi_2O_3$ by shifting the UV edge, i.e. the transition between absorption and transmission, into the longer-wave range. This makes it possible to achieve UV-blocking actions not only up to 240 nm, but even up to 254 nm and above, even with only the abovementioned low levels of $MoO_3$ and/or $Bi_2O_3$. The doping according to the invention, compared to the $TiO_2$ doping of the prior art, makes it possible to dispense altogether with $TiO_2$ or to add it in such small quantities that its disruptive discoloration plays no role.

The glass may contain up to 1% by weight of $Fe_2O_3$ without this having any disadvantageous effect. $Fe_2O_3$ also contributes to shifting the absorption edge into the longer-wave region.

The glass may also contain small proportions, which have no adverse effect on the glass system, of $V_2O_5$, $Nb_2O_5$ and $WO_3$.

The total quantity of $Fe_2O_3$, $CeO_2$, $V_2O_5$, $Nb_2O_5$, $WO_3$, $TiO_2$, PbO, $As_2O_3$, $Sb_2O_3$ should not exceed 5% by weight, since otherwise the glass is excessively discolored in the visible region.

EXEMPLARY EMBODIMENTS

Standard raw materials were used to produce the example glasses and the comparison glasses.

The well-homogenized batch was melted, refined and homogenized in the laboratory in a quartz glass crucible at 1600° C. Then, the glass was cast and cooled at 20 K/h.

The table shows thirteen examples of glasses according to the invention (A1 to A13) and two comparative examples (C1, C2) including their compositions (in % by weight, based on oxide) and their main properties.

The following properties are given in the table:

the coefficient of thermal expansion $\alpha_{20/300}$ [$10^{-6}$/K]

the transformation temperature $T_g$ [° C.]

the working point $V_A$ [° C.]

the softening point $E_W$ [° C.]

the highest wavelength at which $\tau$ is at most 0.1% (for a specimen thickness of 0.2 mm) to document the blocking in the UV region ("UV blocking")

TABLE

Compositions (in % by weight, based on oxide) and important properties of glasses according to the invention (A) and of comparison glasses (C)

| | C1 | C2 | A1 | A2 | A3 | A4 | A5 | A6 | A7 |
|---|---|---|---|---|---|---|---|---|---|
| $SiO_2$ | 68.45 | 67.65 | 72.6 | 78.0 | 72.0 | 68.0 | 59.0 | 69.0 | 68.25 |
| $B_2O_3$ | 19.0 | 19.0 | 14.5 | 10.8 | 16.0 | 12.0 | 16.0 | 8.0 | 19.0 |
| $Al_2O_3$ | 2.65 | 2.65 | 2.0 | 2.0 | 3.0 | 1.0 | 2.0 | 5.0 | 2.65 |
| $Na_2O$ | 0.8 | 0.8 | 2.0 | 2.0 | 2.0 | 1.0 | 1.0 | 1.0 | 0.8 |
| $K_2O$ | 7.7 | 7.7 | — | 1.0 | 1.0 | 3.0 | 3.0 | 3.0 | 7.7 |
| MgO | — | — | 0.5 | 1.0 | 1.0 | 4.0 | 4.0 | 4.0 | — |
| CaO | — | — | 2.0 | 0.9 | 1.9 | 1.9 | 3.9 | 1.9 | — |
| SrO | — | — | 1.6 | 1.0 | 1.0 | 1.0 | 1.0 | 1.0 | — |
| BaO | — | — | — | — | — | 5.0 | 5.0 | 2.0 | — |
| $Li_2O$ | 0.7 | 0.7 | 1.0 | 1.0 | 1.0 | 2.0 | 2.0 | 2.0 | 0.7 |
| ZnO | 0.6 | 0.6 | 2.4 | 1.0 | 1.0 | 1.05 | 2.0 | 2.0 | 0.6 |
| $As_2O_3$ | 0.1 | 0.1 | 0.1 | — | 0.1 | — | 0.1 | 0.1 | 0.1 |
| $Sb_2O_3$ | — | — | — | 0.10 | — | — | — | — | — |
| Cl | — | — | — | — | — | 0.05 | — | — | — |
| $TiO_2$ | — | 0.8 | — | — | — | — | 0.8 | — | — |
| $Bi_2O_3$ | — | — | 1.30 | — | 0.80 | — | 0.2 | 0.7 | 0.2 |
| $MoO_3$ | — | — | — | 1.20 | — | 0.60 | — | 0.3 | — |
| $\alpha_{20/300}$ [$10^{-6}$/K] | 4.68 | 4.73 | 3.45 | 3.42 | 3.77 | 5.24 | 5.78 | 4.97 | 4.7 |
| $T_g$ [° C.] | 485 | 491 | 505 | 515 | 502 | 455 | 449 | 487 | 485 |
| $V_A$ [° C.] | 1055 | 1053 | 1078 | 1190 | 1062 | 872 | 729 | 999 | 1050 |
| $E_W$ [° C.] | 720 | 715 | 761 | 791 | 751 | 626 | 588 | 690 | 720 |
| UV-blocking [nm] | <240 | 261 | 254 | 268 | 250 | 254 | 265 | 251 | 242 |

| | A8 | A9 | A10 | A11 | A12 | A13 |
|---|---|---|---|---|---|---|

TABLE-continued

Compositions (in % by weight, based on oxide) and important properties of glasses according to the invention (A) and of comparison glasses (C)

| | | | | | | |
|---|---|---|---|---|---|---|
| $SiO_2$ | 67.95 | 66.45 | 67.65 | 67.95 | 67.45 | 67.85 |
| $B_2O_3$ | 19.0 | 19.0 | 19.0 | 19.0 | 19.0 | 19.0 |
| $Al_2O_3$ | 2.65 | 2.65 | 2.65 | 2.65 | 2.65 | 2.65 |
| $Na_2O$ | 0.8 | 0.8 | 0.8 | 0.8 | 0.8 | 0.8 |
| $K_2O$ | 7.7 | 7.7 | 7.7 | 7.7 | 7.7 | 7.7 |
| MgO | — | — | — | — | — | — |
| CaO | — | — | — | — | — | — |
| SrO | — | — | — | — | — | — |
| BaO | — | — | — | — | — | — |
| $Li_2O$ | 0.7 | 0.7 | 0.7 | 0.7 | 0.65 | 0.65 |
| ZnO | 0.6 | 0.6 | 0.6 | 0.6 | 0.60 | 0.60 |
| $As_2O_3$ | 0.1 | 0.1 | 0.1 | 0.1 | 0.10 | 0.10 |
| $Sb_2O_3$ | — | — | — | — | — | — |
| Cl | — | — | — | — | — | — |
| $TiO_2$ | — | — | — | — | — | — |
| $Bi_2O_3$ | — | 2.0 | 0.8 | — | — | 0.2 |
| $MoO_3$ | 0.5 | — | — | 0.8 | 1.0 | 0.4 |
| $\alpha_{20/300}$ [$10^{-6}$/K] | 4.72 | 4.81 | 4.8 | 4.8 | 4.86 | 4.73 |
| $T_g$ [° C.] | 485 | 480 | 487 | 485 | 468 | 485 |
| $V_A$ [° C.] | 1050 | 1040 | 1053 | 1050 | 1051 | 1050 |
| $E_W$ [° C.] | 720 | 720 | 720 | 720 | 710 | 720 |
| UV-blocking [nm] | 248 | 259 | 248 | 255 | 262 | 251 |

Comparative Example C1 has a UV edge at too low a wavelength, i.e. it does not sufficiently block the UV region.

The $TiO_2$-containing Comparative Example C2 has a good UV-blocking action, as is also achieved by the doped glasses without the addition of $TiO_2$ in accordance with the invention.

Exemplary embodiments A1, A3, A7, A9 and A20 show glasses doped purely with $Bi_2O_3$. A2, A4, A8, A11 and A12 show glasses doped purely with $MoO_3$. A6 and A13 are examples of mixed doping with $Bi_2O_3$ and $MoO_3$. A5 reveals the boosting action of the optional component $TiO_2$ or, compared to C2, the improvement in the blocking achieved by the invention without it being necessary to increase the $TiO_2$ content.

The glasses according to the invention have a high resistance to solarization, expressed by $\Delta_{15}\tau$ (300 nm; 0.2 mm) of <5%, a high transmission in the visible region, expressed by $\tau$ (>400 nm; 0.2 mm)$\geq$90% and a good UV-blocking action, in particular expressed by $\tau$ ($\leq$240 nm; 0.2 mm)$\leq$0.1% or by the detail giving the highest wavelength at which $\tau$ is at most 0.1% (specimen thickness 0.2 mm). This wavelength is 240 nm or more.

In the preferred embodiments, the glasses have a UV transmission at $\lambda\leq$254 nm of $\tau\leq$0.1%.

Furthermore, the glasses have a working point $V_A$ of <1200° C., so that they can be worked successfully.

The glasses have transformation temperatures $T_g$ of between 440° C. and 580° C. They are therefore suitable for fusing to Kovar, for which purpose it is preferable to use the glasses with $T_g$ of between 440° C. and 530° C., or to, tungsten, for which purpose it is preferable to use the glasses with a higher $T_g$.

Furthermore, the glasses have a coefficient of thermal expansion $\alpha_{20/300}$ of between $3.4\times10^{-6}$/K and $6.0\times10^{-6}$/K. They are therefore sufficiently well matched to the thermal expansion of tungsten or Kovar, i.e. can be fused to one of these materials in a vacuum-tight manner.

With these properties and with $\tau\leq$0.1% at $\lambda\leq$254 nm, the glasses are eminently suitable for the production of fluorescent lamps.

The glasses have a high resistance to crystallization. Consequently, the glasses are eminently suitable for tube drawing, in particular including for the drawing of tubes having the small diameters mentioned above. Therefore, the glasses for fluorescent lamps are also exceedingly well suited to the production of miniaturized fluorescent lamps, for example for the background illumination of displays, e.g. of personal computers, laptops, notebooks, palmtops, vehicle navigation systems, scanners, but also of mirrors and pictures.

The fluorescent lamps produced using the glasses according to the invention, in particular miniaturized fluorescent lamps, satisfy the demands imposed on such lamps.

The invention claimed is:

1. A borosilicate glass, having a coefficient of thermal expansion $\alpha_{20/300}$ of between $3.4\times10^{-6}$/K and $4.86\times10^{-6}$/K and a composition, in percent by weight based on oxide content of:

| | |
|---|---|
| $SiO_2$ | 55-80 |
| $B_2O_3$ | 8-25 |
| $Al_2O_3$ | 0.5-10 |
| $Li_2O + Na_2O + K_2O$ | 1-16 |
| $MgO + CaO + SrO + BaO$ | 0-6 |
| ZnO | 0.6-3 |
| $Bi_2O_3$ | 0-2.0 |
| $MoO_3$ | 0-1.20 |
| with $Bi_2O_3 + MoO_3$ | 0.01-2.0; | and which is free of $ZrO_2$.

2. The borosilicate glass as defined in claim 1, containing from 55-79 percent by weight of said $SiO_2$ and from 10-25 percent by weight of said $B_2O_3$.

3. The borosilicate glass as defined in claim 1, containing from 73-79 percent by weight of said $SiO_2$, from 12.5-25 percent by weight of said $B_2O_3$, and from 1-11 percent by weight of a total amount of said $Li_2O+Na_2O+K_2O$.

4. The borosilicate glass as defined in claim 1, containing from 55-73 percent by weight of said $SiO_2$, from 15-25 percent by weight of said $B_2O_3$, from 1-10 percent by weight of said $Al_2O_3$, and from 4-16 percent by weight of a total amount of said $Li_2O+Na_2O+K_2O$.

5. The borosilicate glass as defined in claim 1, containing from 55-79 percent by weight of said $SiO_2$ and from 8-12.5 percent by weight of said $B_2O_3$.

6. The borosilicate glass as defined in claim 1, containing a total amount of said $Bi_2O_3+MoO_3$ of from 0.1 to 2.0 percent by weight.

7. The borosilicate glass as defined in claim 6, wherein said total amount of said $Bi_2O_3+MoO_3$ is from 0.2 to 2.0 percent by weight.

8. The borosilicate glass as defined in claim 1, additionally containing, in percent by weight based on oxide content:

| | |
|---|---|
| $Fe_2O_3$ | 0-1 |
| $CeO_2$ | 0-1 |
| $TiO_2$ | 0-5 |
| $PbO$ | 0-3 |
| $As_2O_3$ | 0-1 |
| $Sb_2O_3$ | 0-1 |
| with $Fe_2O_3 + CeO_2 + TiO_2 + PbO +$ $As_2O_3 + Sb_2O_3 + V_2O_5 + Nb_2O_5 + WO_3$ | 0-5 |
| $SnO_2$ | 0-1 |
| F | 0-1 |
| Cl | 0-0.5 |
| $SO_3$ | 0-0.5. |

9. The borosilicate glass as defined in claim 1, having a transformation temperature Tg of between 440° C. and 580° C. and having a transmission τ at $\lambda \leq 240$ nm of $\leq 0.1\%$ for a specimen thickness of 0.2 mm.

10. The borosilicate glass as defined in claim 1, having a transformation temperature Tg of between 440° C. and 580° C. and having a transmission τ at $\lambda \leq 254$ nm of $\leq 0.1\%$ for a specimen thickness of 0.2 mm.

11. A fluorescent lamp produced from the borosilicate glass as claimed in claim 10.

12. A miniaturized fluorescent lamp produced from the borosilicate glass as claimed in claim 10.

* * * * *